United States Patent [19]

Ash

[11] 4,355,835
[45] Oct. 26, 1982

[54] LIGHTWEIGHT ONE PIECE SIDE RACK WITH STAKES FOR FLATBED SEMITRAILERS

[75] Inventor: Earl M. Ash, Oakland, Mich.

[73] Assignee: The United States of America as represented by the Secretary of the Army, Washington, D.C.

[21] Appl. No.: 194,646

[22] Filed: Oct. 6, 1980

[51] Int. Cl.³ .............................................. B62D 27/06
[52] U.S. Cl. ......................................... 296/36; 296/43
[58] Field of Search ................ 296/43, 181, 183, 191, 296/31 P, 36, 3, 10; 105/380, 390; 410/121, 127

[56] References Cited

U.S. PATENT DOCUMENTS 2,579,774 12/1951 Akey ....................................... 296/43
3,010,755 11/1961 Black ....................................... 296/43
3,365,230 1/1968 Langdon ................................ 296/3

Primary Examiner—Robert R. Song
Attorney, Agent, or Firm—Peter A. Taucher; John E. McRae; Nathan Edelberg

[57] ABSTRACT

A panel for upright positionment on a trailer/truck flatbed to convert the bed into a cargo container. The panel is formed as a one piece high density plastic foam or fiberglass reinforced plastic element having desired characteristics of high strength and light weight. At its lower edge the panel has a relatively wide center leg and two relatively narrow end legs dimensioned for snug fit insertion into pockets on the perimeter of the flatbed. Edge areas of the panel are preferably formed as tongue and groove devices to adapt the panel for interlocking connection with similar panels positioned on the flatbed.

2 Claims, 6 Drawing Figures

LIGHTWEIGHT ONE PIECE SIDE RACK WITH STAKES FOR FLATBED SEMITRAILERS

BACKGROUND AND SUMMARY

Conventional flatbed trailers and trucks are often equipped with rectangular pockets spaced at regular intervals along the perimeter of the flatbed to receive removable upright stakes or posts, said stakes or posts being configured to retain panels in upright attitudes on the perimeter of the flatbed. The stake-panel assemblages in effect form vertical walls for converting the flatbed into a container or open-topped box suitable to receive cargo or loose materiels that cannot conveniently be handled by the flatbed.

Under conventional practice the posts or stakes are separately formed from the panels, as shown for example in U.S. Pat. No. 3,692,354 issued to R. P. Tuerk. In some cases the stakes are attached to the panels, as by riveting or bolting procedures. Most often the panels are formed of plywood, steel or plastic composites such as plastic foam incapsulated within a fiberglass skin.

As far as I know, in plastic composite structures the plastic composite panel elements are formed separately from the stakes; the only unitary panel-stake units that I am aware of have been formed of steel and wood or steel and plywood. My invention contemplates a unitary panel-stake construction formed as a one piece molded element from high density plastic foam structural material or fiberglass reinforced plastic material of the type disclosed for example in U.S. Pat. No. 3,211,605 issued to A. Spaak et al; or U.S. Pat. No. 3,268,636 issued to R. G. Angell, Jr.; or U.S. Pat. No. 3,384,691 issued to S. N. Weissman et al. Principal objects of my invention are to provide a structural foam or fiberglass reinforced plastic stake-panel element having practical advantages as regards initial cost, low weight, easy handling characteristics, durability, long service life, low maintenance requirements, and good tolerance to physical abuse.

The invention described herein may be manufactured, used and licensed by or for the Government for governmental purposes without payment to me of any royalty thereon.

IN THE DRAWINGS

Figure 1:
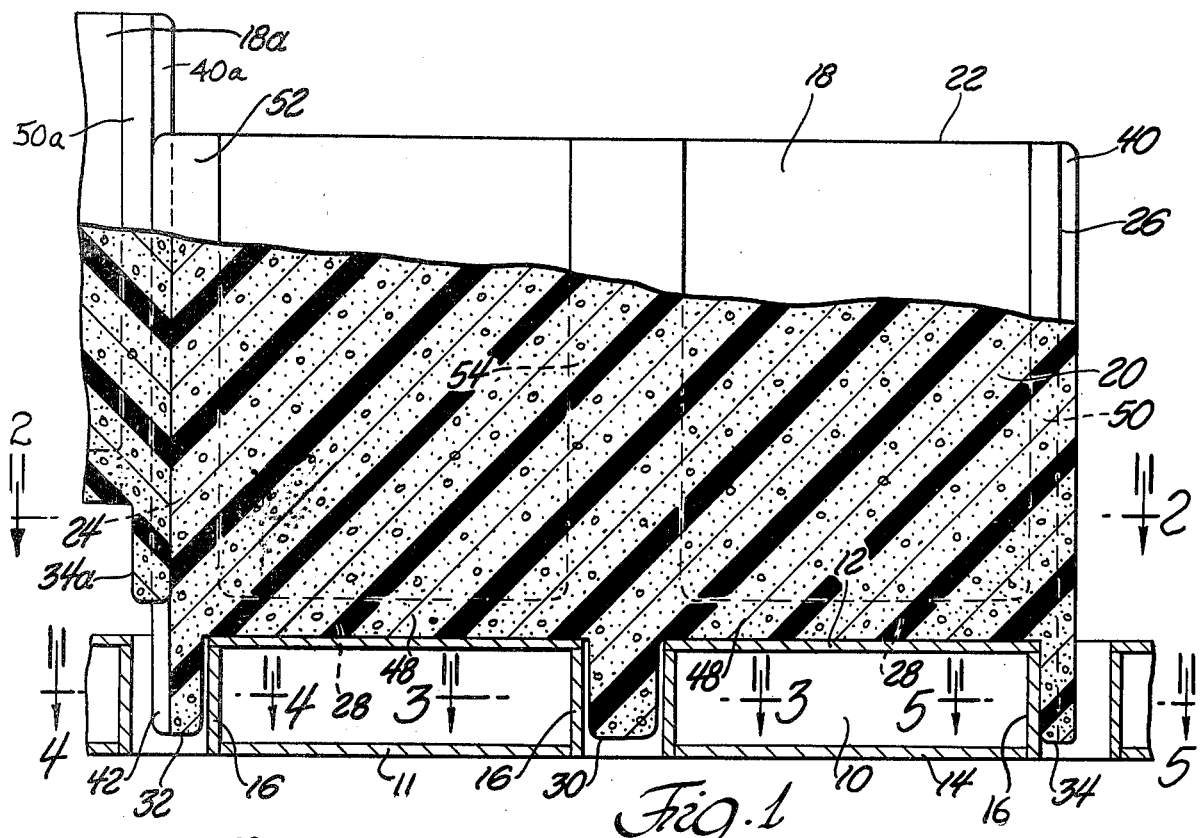
FIG. 1 is a fragmentary sectional view taken through a flatbed trailer or truck equipped with a stake-panel unit incorporating my invention.

Referring in greater detail to FIG. 1 of the drawings, there is fragmentarily shown a conventional truck or trailer flatbed 10 that is equipped at its perimeter with a metallic beam 11 that includes an upper flange 12 and a lower flange 14; pocket-forming tubes 16 extend between flanges 12 and 14 at spaced points along the length of the beam. In a conventional arrangement the pocket centerlines would be spaced about 24 inches apart. Each pocket may be about 1 ¾ inch wide, 3 ⅜ inch long and 6 inch deep.

Figure 3:
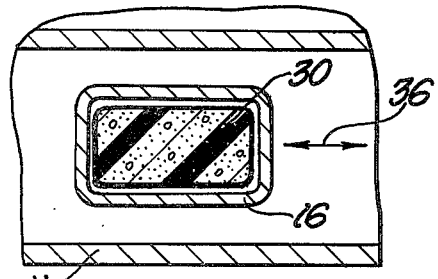
FIG. 3 is a sectional view taken on line 3—3 in FIG. 1.
Figure 4:
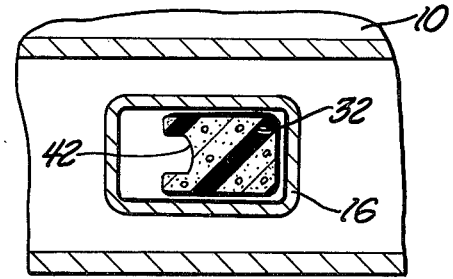
FIG. 4 is a sectional view taken on line 4—4 in FIG. 1.
Figure 5:
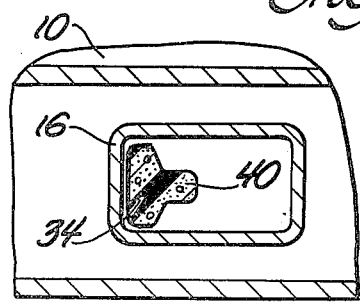
FIG. 5 is a sectional view taken on line 5—5 in FIG. 1.

My invention relates to a panel 18 formed as a unitary molded element from high density plastic foam or fiberglass reinforced plastic by conventional practices described for example in aforementioned U.S. Pat. Nos. 3,211,605; 3,268,636; and 3,384,691. Panel 18 includes a main rectangular section 20 defining a panel upper edge 22, a left side edge 24, a right side edge 26, and a lower edge 28. Projecting downwardly from the lower edge 28 are three legs designated by numerals 30, 32, and 34. Center leg 30 is located on the vertical centerline of the panel for occupying the center most pocket 16, whereas the other legs 32 and 34 are located at respective ones of the panel side edges 24 and 26 for occupying the other illustrated pockets 16. As shown in FIG. 3, leg 30 has a width in the plane of the panel approximately the same as the corresponding dimension of the mating pocket 16 for providing a close leg-pocket position without appreciable shifting movement in the arrow 36 direction. The other legs 32 and 34 shown in cross section in FIGS. 4 and 5 have widths approximately one half the corresponding dimensions of the mating pocket 16 such that the legs on adjacent panels cooperatively occupy associated ones of the pockets, as illustrated for example in FIG. 6.

FIG. 1 fragmentarily illustrates a second panel 18a constructed similarly to panel 18, said panel 18a having a leg 34a constructed similarly to above-described leg 34 for positionment alongside leg 32 of panel 18. Panel 18a is shown in a position elevated from its normal position on the bed. Preferably the vertical edges of the panel are formed with vertical grooves and mating ribs so that one panel interfits with another into a relatively rigid structure extending the full length of the aforementioned beam 11. In the illustrated arrangement panel side edge 26 is formed with an integral vertical rib 40 (FIG. 5) extending from the upper edge 22 of the panel to the lower tip of leg 34; the other vertical edge 24 of the panel is formed with a vertical groove 42 (FIG. 4) extending from upper edge 22 of the panel to the lower tip of leg 32. When adjacent panels are installed on the flatbed the rib of one panel extends into the groove on an adjacent panel, thereby causing each panel to reinforce the other against weaving or bending in response to in-service forces.

Figure 6:
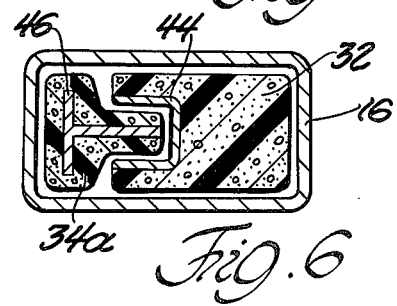
FIG. 6 is a fragmentary sectional view taken in a direction similar to FIG. 4 but illustrating another embodiment of my invention.

FIG. 6 fragmentarily illustrates an embodiment of the invention wherein the above-mentioned groove 42 is defined by a metallic channel element 44, preferably steel, molded into the panel and having sufficient wall thickness to act as a rigidifying reinforcement for the panel. A similar metallic element 46 of T-shaped cross section may be molded as an insert in the interfitting portion of the adjacent panel. The metallic reinforcement elements preferably extend the full height of the associated panel; each metallic element may have a wall thickness of approximately 0.080 inches.

Figure 2:
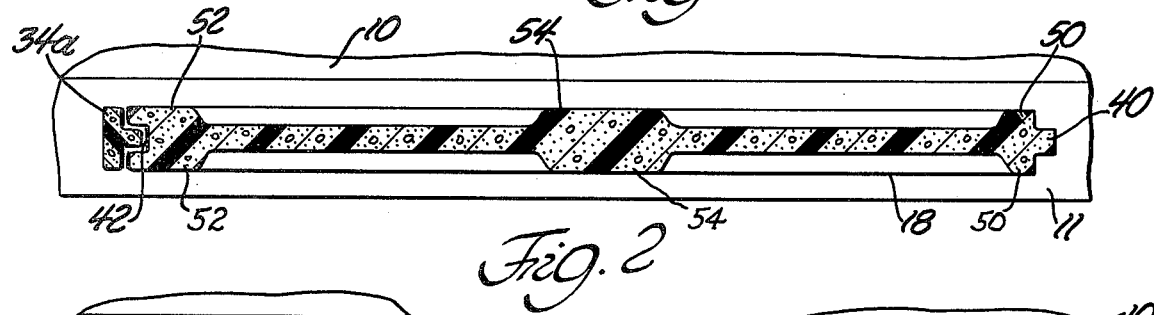
FIG. 2 is a sectional view taken on line 2—2 in FIG. 1.

The panel in its preferred form is constructed with embossed areas on one or both of its faces to rigidify the panel against bending forces. As shown by the dashed lines in FIG. 1, the embossed areas extend along the panel lower edge as designated by numeral 48, along the right vertical edge of the panel as designated by numeral 50, along the left edge of the panel as designated by numeral 52, and along the vertical centerline of the panel as designated by numeral 54. FIG. 2 illustrates the embossed areas in cross section. In general, embossed area 48 reinforces the panel against bending or warping in a horizontal plane, whereas embossed areas 50, 52 and 54 reinforce the panel against bending or warping in vertical planes. The panel may be embossed on only one of its major faces, although a greater safety factor is realized when both faces of the panel are embossed as shown in the drawings. The aforementioned legs 30, 32 and 34 are contiguous to the embossed area so that the legs and embossed areas have the same transverse thickness. In a representative construction the embossed areas would have a transverse thickness of about 1 ½ inch, whereas the intervening non-embossed areas would have a transverse thickness of about ¾ inch.

The illustrated panel is believed to achieve the aforementioned advantages, namely low initial cost, low weight, easy handling, durability, long service life, low maintenance requirements, and good tolerance for physical abuse. The illustrated panel may also be considered advantageous for achieving a slight increase in the inclosed cargo area compared to certain conventional panel constructions. In some conventional arrangements the stakes that extend into pockets 16 are attached to the outer faces of the cargo-confining panels; the panel plane is thus slightly inboard from the general plane of pockets 16. In my illustrated arrangement the panel plane is coincident with the general plane of pockets 16, thus providing a slightly larger cargo area than would be achieved with the described conventional arrangement.

It will be appreciated that the invention may be practiced in other forms than are shown in the drawings. For example, it would be possible to shorten or entirely omit the tongue and groove joints at 40, 42; i.e. by making each leg 32 or 34 of essentially square cross-section, such that each leg occupies one half of the pocket space; a clamping means would have to be provided to contain the top ends of the panels. As previously noted, the panel can be embossed on only one of its faces. Also, the configurations and locations of the embossed areas may be varied in accordance with in-field test results or special loading conditions. The drawings show the presently-preferred embodiments of my invention.

I claim:

1. A panel adapted for positionment in an upright attitude along the perimeter of a flatbed truck or trailer: said upright panel including a rectangular section defining an upper edge, lower edge, and two side edges; three legs projecting downwardly from the lower edge of the panel rectangular section for positionment in pockets located on the aforementioned flatbed; a first one of the legs being located on the vertical centerline of the panel, a second one of the legs being located at one of the panel side edges, and a third one of the legs being located at the other panel side edge; the first leg having a width in the plane of the panel approximately the same as the corresponding dimension of the mating pocket; each of the second and third legs having a width in the plane of the panel approximately one half the corresponding dimension of the mating pocket, whereby legs on adjacent panels cooperatively occupy selected ones of the pockets; the rectangular panel section and downwardly-projecting legs being integrally formed as a unitary high density plastic foam molded element; one of the panel side edges and associated leg having a vertical groove therealong for receiving an edge area of an adjacent panel when the panels are in place on the flatbed; the other panel side edge and associated leg having a rib therealong, said rib having a transverse thickness slightly less than the width of the aforementioned vertical groove whereby a rib on one panel extends into a groove on an adjacent panel when the panels are in place on the flatbed; the panel being outwardly embossed in selected areas to rigidify the panel against bending forces; said embossed areas including a first area extending along the panel lower edge, a second area extending along one of the panel vertical edges, a third area extending along the other panel vertical edge, and a fourth area extending along the panel vertical centerline; the embossed areas projecting outwardly from both major faces of the panel; the aforementioned legs being contiguous to the embossed areas of the panel so that the legs and embossed areas have the same transverse thickness.

2. The panel of claim 1: the vertical groove in said one edge of the panel being defined by a metallic channel element insert having sufficient wall thickness to act as a rigidifying reinforcement for the panel; the rib in the other edge of the panel having a T-shaped metallic insert element molded therein to provide a rigidfying reinforcement for said other panel edge.

* * * * *